United States Patent
Yang et al.

(10) Patent No.: US 11,140,737 B2
(45) Date of Patent: Oct. 5, 2021

(54) SESSION PROCESSING METHOD IN WIRELESS COMMUNICATIONS AND TERMINAL DEVICE

(71) Applicant: Huawei Technologies Co., Ltd., Shenzhen (CN)

(72) Inventors: Linping Yang, Shanghai (CN); Wen Hu, Shanghai (CN); Xibo Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/778,539

(22) Filed: Jan. 31, 2020

(65) Prior Publication Data
US 2020/0170066 A1 May 28, 2020

Related U.S. Application Data

(63) Continuation of application No. PCT/CN2017/096076, filed on Aug. 4, 2017.

(51) Int. Cl.
*H04W 76/18* (2018.01)
*H04W 48/08* (2009.01)

(52) U.S. Cl.
CPC ........... *H04W 76/18* (2018.02); *H04W 48/08* (2013.01)

(58) Field of Classification Search
CPC .............................. H04W 76/18; H04W 48/08
See application file for complete search history.

(56) References Cited

U.S. PATENT DOCUMENTS

| | | | |
|---|---|---|---|
| 2006/0129684 A1 | 6/2006 | Datta | |
| 2009/0265471 A1 | 10/2009 | Li et al. | |
| 2010/0153807 A1 | 6/2010 | Kakani | |
| 2012/0094631 A1 | 4/2012 | Pattabiraman | |
| 2012/0170453 A1 | 7/2012 | Tiwari | |
| 2014/0177429 A1 | 6/2014 | Patil et al. | |
| 2015/0119092 A1 | 4/2015 | Yi et al. | |
| 2016/0205040 A1 | 7/2016 | Wirtanen et al. | |
| 2017/0070892 A1 | 3/2017 | Song et al. | |
| 2017/0141973 A1 | 5/2017 | Vrzic | |

(Continued)

FOREIGN PATENT DOCUMENTS

| | | |
|---|---|---|
| CN | 101267662 A | 9/2008 |
| CN | 101355524 A | 1/2009 |

(Continued)

OTHER PUBLICATIONS

3GPP TS 24.008 V14.4.0, "3rd Generation Partnership Project; Technical Specification Group Core Network and Terminals; Mobile radio interface Layer 3 specification; Core network protocols; Stage 3 (Release 14)," June 764 pages.

(Continued)

*Primary Examiner* — Marisol Figueroa
(74) *Attorney, Agent, or Firm* — Conley Rose, P.C.

(57) ABSTRACT

A session processing method in wireless communications and a terminal device include sending, by the terminal device, a session establishment request to a core network device, where the session establishment request requests to establish a session, and the session is supported by a network slice corresponding to the session, determining, by the terminal device, that establishment of the session fails, determining, by the terminal device, a forbidden time period corresponding to the session, and forbidding, by the terminal device, the terminal device from sending the session establishment request within the forbidden time period.

20 Claims, 5 Drawing Sheets

(56) References Cited

U.S. PATENT DOCUMENTS

| 2018/0167873 | A1 | 6/2018 | Li | |
|---|---|---|---|---|
| 2019/0021047 | A1 | 1/2019 | Zong | |
| 2019/0223093 | A1* | 7/2019 | Watfa | H04W 36/06 |
| 2020/0221529 | A1* | 7/2020 | Park | H04W 8/08 |

FOREIGN PATENT DOCUMENTS

| CN | 101743716 A | 6/2010 |
|---|---|---|
| CN | 102711141 A | 10/2012 |
| CN | 102892177 A | 1/2013 |
| CN | 104871634 A | 8/2015 |
| CN | 106375987 A | 2/2017 |
| CN | 106507405 A | 3/2017 |
| CN | 106572517 A | 4/2017 |
| EP | 2339875 A1 | 6/2011 |

OTHER PUBLICATIONS

3GPP TS 24.301 V14.4.0, "3rd Generation Partnership Project; Technical Specification Group Core Network and Terminals; Non-Access-Stratum (NAS) protocol for Evolved Packet System (EPS); Stage 3 (Release 14)," Jun. 2017, 486 pages.

3GPP TR 24.890 V0.0.0, "3rd Generation Partnership Project; Technical Specification Group Core Network and Terminals; 5G System—Phase 1; CT WG1 Aspects (Release 15)," Mar. 2017, 10 pages.

Huawei, et al., "UE Slice Association/Overload control Procedure," 3GPP TSG SA WG2 Meeting #115,S2-162981, May 23-27, 2016, Nanjing, China, 8 pages.

Kddi, "23.501: Introducing congestion and overload control for AMF and SMF," 3GPP TSG SA WG2 Meeting #118bis, S2-170299, Jan. 16-20, 2017, Spokane, USA, 2 pages.

Samsung, "23.502: Update of UE triggered Service Request in CM-Conneced state," SA WG2 Meeting #122, S2-174813, Jun. 26-30, 2017 San Jose Del Cabo, Mexico, 6 pages.

3GPP TS 23.501 V1.2.0, "3rd Generation Partnership Project; Technical Specification Group Services and System Aspects; System Architecture for the 5G System; Stage 2 (Release 15)," Jul. 2017, 166 pages.

* cited by examiner

SESSION PROCESSING METHOD IN WIRELESS COMMUNICATIONS AND TERMINAL DEVICE

CROSS-REFERENCE TO RELATED APPLICATIONS

This application is a continuation of International Patent Application No. PCT/CN2017/096076 filed on Aug. 4, 2017, which is hereby incorporated by reference in its entirety.

TECHNICAL FIELD

This application relates to the field of communications technologies, and in particular, to a session processing method in wireless communications and a terminal device.

BACKGROUND

A physical network can be divided into a plurality of virtual networks using a network slicing technology. A virtual network is considered as a "network slice". Each network slice is independent of each other. A network function of each network slice is customized and managed based on a service scenario. Therefore, the network slice corresponds to one or more specific services. A session currently performed by a terminal device has a plurality of service types, and the session of different service types may need a network slice corresponding to each service type to provide a service.

When the terminal device requests to establish a session, a session establishment failure always caused because authentication fails, a network slice is unavailable, a network slice resource is insufficient, or the like. For the terminal device, once the session establishment failure occurs, a session establishment request is immediately initiated again. However, if the session establishment failure is caused by the foregoing reason, generally no change can be made in a short time, and the terminal device still obtains a result that establishment of the session fails. Therefore, in this scenario, how to reduce signaling overheads caused when the session establishment failure occurs again in the terminal device needs to be resolved.

SUMMARY

Embodiments of the present disclosure provide a session processing method in wireless communications and a terminal device in order to reduce signaling overheads between the terminal device and a network side.

According to a first aspect, an embodiment of this application provides a session processing method in wireless communications, including sending, by a terminal device, a session establishment request to a core network device, where the session establishment request is used to request to establish a session, and the session requested to be established is supported by a network slice corresponding to the session, determining, by the terminal device, that establishment of the session fails, determining, by the terminal device, a forbidden time period corresponding to the session, and forbidding the terminal device from sending the session establishment request within the forbidden time period.

According to the first aspect, after determining, by the terminal device, that establishment of the session fails, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

In an optional implementation, before determining, by the terminal device, that establishment of the session fails, the method further includes receiving, by the terminal device, an authentication request from the core network device, and authenticating, by the terminal device, the core network device based on the authentication request to obtain an authentication result, where the authentication result is that authentication fails. In this case, determining, by the terminal device, that establishment of the session fails means determining that establishment of the session fails based on the authentication result. If the authentication result is that authentication fails, it indicates that the core network device is an inaccessible core network device. Optionally, the terminal device sends an authentication failure message to the core network device. Because authentication failure cannot be resolved in a short time, even after the terminal device determines that the authentication on the core network device fails, a case in which the authentication on the core network device still fails occurs when the terminal device sends a session establishment request again. Therefore, signaling overheads can be reduced by forbidding the terminal device from sending the session establishment request.

Optionally, a forbidden time period determined for the authentication failure may indicate permanent forbidding, that is, the forbidden time period is infinite. The forbidden time period corresponding to the session is determined by the terminal device.

In an optional implementation, the terminal device further receives an authentication reject message from the core network device. In this case, determining, by the terminal, that establishment of the session fails is implemented using the authentication reject message. Because authentication reject cannot be resolved in a short time, even after the authentication reject message is received, a case in which the core network device rejects the authentication to the terminal device still occurs when the terminal device sends a session establishment request again. Therefore, signaling overheads can be reduced by forbidding the terminal device from sending the session establishment request.

Optionally, a forbidden time period determined for the authentication reject may indicate permanent forbidding, that is, the forbidden time period is infinite. The authentication reject message may carry the forbidden time period. In this case, the forbidden time period corresponding to the session is determined by the core network device. For another example, the authentication reject message may not carry the forbidden time period either. In this case, the forbidden time period corresponding to the session is determined by the terminal device. A specific manner in which the terminal device or the core network device determines the forbidden time period is not limited in this embodiment of the present disclosure.

In an optional implementation, the terminal device further receives a session establishment failure message from the core network device. In this case, determining, by the terminal, that establishment of the session fails is implemented using the session establishment failure message. The session establishment failure message includes first indication information or second indication information. The first indication information is used to indicate that a resource of the network slice corresponding to the session is limited, and the second indication information is used to indicate that the network slice corresponding to the session is unavailable. Because the problem that the network slice is unavailable or the network resource is insufficient cannot be resolved in a short time, even after the terminal device receives the session establishment failure message, a case in which the terminal device receives a corresponding failure message still occurs when the terminal device sends the session establishment request again. Therefore, signaling overheads can be reduced by forbidding the terminal device from sending the session establishment request.

Optionally, a forbidden time period determined for the problem that the resource of the network slice is limited or the network slice is unavailable may be a preset time period, that is, the forbidden time period is limited. The session establishment failure message may carry the forbidden time period. In this case, the forbidden time period corresponding to the session is determined by the core network device. For another example, the session establishment failure message may not carry the forbidden time period either. In this case, the forbidden time period corresponding to the session is determined by the terminal device. A specific manner in which the terminal device or the core network device determines the forbidden time period is not limited in this embodiment of the present disclosure.

In an optional implementation, the terminal device may further receive a first message from the core network device within the forbidden time period, where the first message is used to indicate that the terminal device is allowed to send the session establishment request. The terminal device resumes allowing sending the session establishment request in response to the first message. In this way, forbidding on the session may be canceled using the first message such that the terminal device sends the session establishment request corresponding to the session.

In an optional implementation, the forbidding the terminal device from sending the session establishment request within the forbidden time period may include if a serving network of the terminal device is changed from a first public land mobile network (PLMN) to a second PLMN within the forbidden time period, and both a network device of the first PLMN and a network device of the second PLMN support the network slice corresponding to be session, forbidding the terminal device from sending the session establishment request within the forbidden time period.

According to a second aspect, an embodiment of the present disclosure provides a terminal device, including a sending unit configured to send a session establishment request to a core network device, where the session establishment request is used to request to establish a session, and the session requested to be established is supported by a network slice corresponding to the session, a processing unit configured to determine that establishment of the session fails, where the processing unit is further configured to determine a forbidden time period corresponding to the session, and the processing unit is further configured to forbid sending the session establishment request within the forbidden time period.

According to the second aspect, after the terminal device determines that establishment of the session fails, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

According to a third aspect, an embodiment of the present disclosure provides a terminal device. The terminal device includes a processor and a transceiver. Optionally, the terminal device further includes a memory. The processor is connected to the memory and the transceiver. For example, the processor may be connected to the memory and the transceiver using a bus. The transceiver is configured to communicate with a base station, a core network device, or the like. The memory is configured to store information associated with a session, and the like. The processor is configured to perform some or all of the procedures of the first aspect.

According to a fourth aspect, an embodiment of the present disclosure provides a storage medium, where the storage medium stores program code. When the program code is executed by a computing device, the session processing method according to any one of the first aspect or the implementations of the first aspect is performed. The storage medium includes but is not limited to a flash memory, a hard disk, or a solid-state drive.

According to a fifth aspect, an embodiment of the present disclosure provides a computer program product. When the computer product is run by a computing device, the session processing method according to any one of the first aspect or the implementations of the first aspect is performed.

DESCRIPTION OF EMBODIMENTS

Figure 1A:
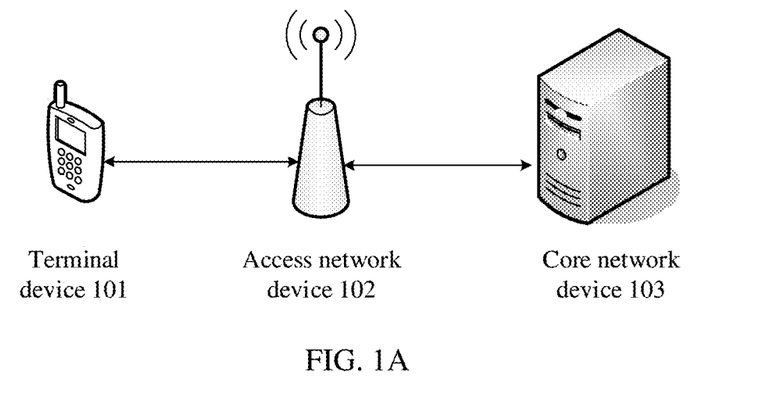
FIG. 1A is a schematic architectural diagram of a possible communications system according to an embodiment of the present disclosure.

The following describes the embodiments of the present disclosure with reference to the accompanying drawings in the embodiments of the present disclosure. FIG. 1A is a schematic architectural diagram of a possible communications system according to an embodiment of the present disclosure. Network elements are described as follows.

A terminal device may be user equipment (UE), and the UE accesses a network side using an access network device, for example, may be a handheld terminal device, a notebook computer, a subscriber unit, a cellular phone, a smartphone, a wireless data card, a personal digital assistant (PDA)

computer, a tablet computer, a wireless modem, a handheld device, a laptop computer, a cordless phone, or a wireless local loop (WLL) station, a machine type communication (MTC) terminal or another device that can access the network. The terminal device communicates with the access network device using an air interface technology.

A radio access network (RAN) device mainly has functions such as radio resource management, quality of service (QoS) management, data compression, and data encryption on an air interface side. The access network device may include base stations in various forms, for example, a macro base station, a micro base station (also referred to as a small cell), a relay station, and an access point. In a system using different radio access technologies, devices having a base station function may have different names. For example, in a fifth-generation (5G) system, the device is referred to as a gNB, in Long Term Evolution (LTE) system, the device is referred to as an evolved nodeB (eNB or eNodeB), and in a third-generation (3G) system, the device is referred to as a nodeB.

The core network device is configured to establish a connection to the terminal device, manage the terminal device, and complete service bearing. For example, the establishment of the connection to the terminal device has functions such as mobility management (MM) and paging. Management on the terminal device includes description, QoS, and security of the terminal device (corresponding security measures provided by an authentication center include security management on a mobile service and security processing on external network access). A bearer connection includes a public switched telephone network (PSTN) connected to the external, an external circuit data network, an external packet data network, internet, and the like.

For example, the core network device may have an access and MM function (AMF) that is mainly responsible for processing signaling, that is, have a control plane function, having functions such as access control, MM, attach and detach, and gateway selection.

For example, the core network device may have a session management function (SMF) that is responsible for selecting a user plane network element, redirecting the user plane network element, allocating Internet Protocol (IP) addresses, establishing, modifying, and releasing a bearer, and controlling the QoS.

For example, the core network device may include a user plane function (UPF) network element that is responsible for forwarding and receiving user data in the terminal device. The UPF network element may receive the user data from a data network, and transmit the user data to the terminal device using an access network device. Alternatively, the UPF network element may receive the user data from the terminal device using an access network device, and forward the user data to a data network. A transmission resource and a scheduling function in the UPF network element that provide a service for the terminal device are managed and controlled by the SMF network element. The core network device in the embodiments of the present disclosure is not limited to the AMF network element, the SMF network element, and the UPF network element.

An access network device 102 in FIG. 1A may be connected to a terminal device 101. Optionally, the access network device 102 may be connected to a plurality of terminal devices. The access network device 102 may be connected to a core network device 103. Optionally, the access network device 102 may be connected to a plurality of core network devices. The terminal device 101 and the core network device 103 need to communicate with each other using the access network device 102.

The core network device 103 may include at least one AMF network element, at least one SMF network element, and at least one UPF network element. The access network device 102 may be connected to one or more AMF network elements. One AMF network element may support one or more network slices in different types. Different AMF network elements support different types of network slices. Each SMF network element is located in one network slice instance, one SMF network element corresponds to a network slice supported by one AMF network element, and one AMF network element may establish communication connections with a plurality of SMF network elements. Optionally, one SMF network element may be connected to a plurality of AMF network elements. In addition, one SMF network element may be connected to a plurality of UPF network elements, and one UPF network element may be connected to one SMF network element. In this case, one SMF network element may manage and control a plurality of UPF network elements, and one UPF network element is managed and controlled by one SMF. The UPF network element may establish a connection to an access network device, to implement data transmission related to the terminal device.

Figure 1B:
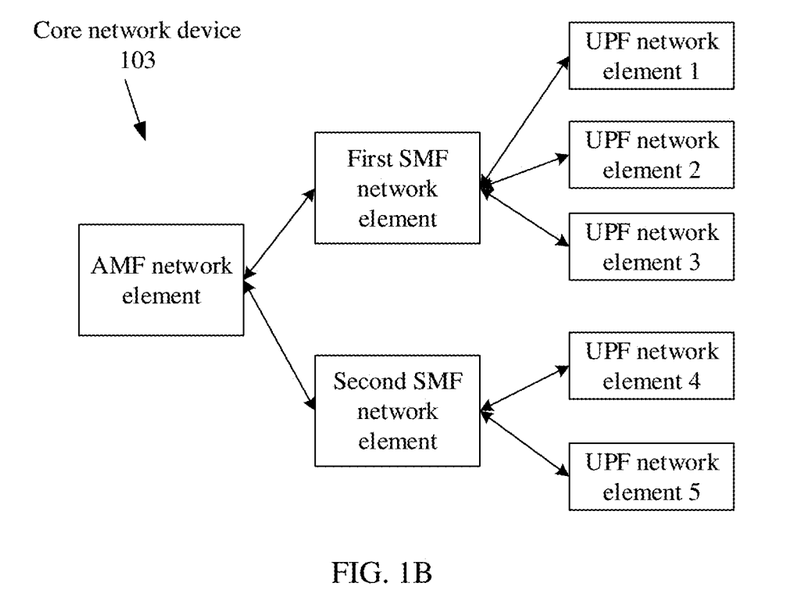
FIG. 1B is an example diagram of an optional core network device according to an embodiment of the present disclosure.

For example, FIG. 1B is an example diagram of an optional core network device 103 according to an embodiment of the present disclosure. One AMF network element is connected to two SMF network elements, and the two SMF network elements are a first SMF network element and a second SMF network element respectively. Network slice types supported by the AMF network element include a network slice type 1 and a network slice type 2. The network slice type 1 is a type of a network slice 1, and the network slice type 2 is a type of a network slice 2. A first SMF network element is preset to be an SMF network element corresponding to the network slice 1, and a second SMF network element is preset to be an SMF network element corresponding to the network slice 2.

Optionally, the network slice corresponding to the SMF network element may also be described as a network slice in which the SMF network element is located. Further, optionally, a same network slice type may correspond to a plurality of network slice instances. Therefore, the network slice corresponding to the SMF network element may also be described as a network slice instance corresponding to the SMF network element, and the network slice in which the SMF network element is located may also be described as a network slice instance in which the SMF network element is located. This is not limited in this embodiment of the present disclosure.

Each network slice is independent of each other. A network function of each network slice is customized and managed based on a service scenario. There are a plurality of service types in the terminal device, for example, an enhanced mobile broadband (eMBB) service, ultra-reliable low latency communication (URLLC), and massive MTC (mMTC). Network slices corresponding to different types of service sessions may be different. Even for a same service type, the same service type may also be corresponding to different network slices because operators or service providers are different. In this way, when the terminal device requests to establish a specific session, a core network side selects a corresponding network slice based on indication information of the network slice corresponding to the session. Therefore, the network slice is a virtual network and corresponds to at least one type of specific service of the terminal device. The session may be a session that is based on a corresponding service of the network slice. For example, the session may be a packet data unit (PDU) session.

In an embodiment, after the access network device determines a core network device that provides a service for the terminal device, the terminal device sends a session establishment request to the core network device such that the core network device determines whether a session can be established for the terminal device. However, the terminal device detects that a session establishment failure is caused because the authentication on the core network device fails, the core network device rejects the authentication to the terminal device, the network slice corresponding to the session on the network side is unavailable, or a resource of the network slice corresponding to the session on the network side is insufficient, or the like. Therefore, in this embodiment of the present disclosure, after the terminal device determines that establishment of the session fails, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

It should be further noted that, indication information of each network slice in any embodiment of this application may include at least one of a network slice identifier and single network slice selection assistance information (S-NSSAI).

The network slice identifier may be represented using at least one of the following information (1) to (7).

(1) Network slice type information. For example, the network slice type information may indicate network slice types of services such as eMBB, URLLC, and mMTC. Optionally, the network slice type information may further indicate an end-to-end network slice type, including a network slice type from a RAN side to a core network (also referred to as CN) side, may also refer to a network slice type on a RAN side, or a network slice type on a CN side.

(2) Service type information. The service type information is related to a specific service. For example, the service type information may indicate information about a service feature or a specific service such as a video service, an internet of vehicles service, or a voice service.

(3) Tenant information. The tenant information is used to indicate information about a client creating or renting the network slice, for example, TENCENT or the State Grid.

(4) User group information. The user group information is used to indicate grouping information used to group users based on a feature, for example, a user level.

(5) Slice group information. The slice group information is used to indicate a slice group divided based on a specific feature. For example, all network slices accessible by the terminal device may be considered as one slice group, or the network slices may be grouped according to another standard.

(6) Network slice instance information. The network slice instance information is used to indicate an instance identifier and feature information that are created for the network slice. For example, an identifier may be allocated to a network slice instance to indicate the network slice instance, or a new identifier may be mapped based on an identifier of a network slice instance, to associate the network slice instance, and a receiving party can identify, based on the identifier, a specific network slice instance indicated by the identifier.

(7) Dedicated core network (DCN) identifier. The identifier is used to uniquely indicate a network, for example, a DCN in an LTE system or an enhanced LTE (eLTE) system, such as a core network dedicated for the internet of things. Optionally, mapping between the DCN identifier and a network slice identifier may be performed, the network slice identifier may be mapped using the DCN identifier, and the DCN identifier can also be mapped using the network slice identifier.

The S-NSSAI at least includes slice/service type (SST) information, and optionally, may further include slice differentiator (SD) information. The SST information is used to indicate a behavior of the network slice, for example, a feature and a service type of the network slice. The SD information is SST supplementary information, and if the SST points to a plurality of network slice instances, the SD may correspond to one unique network slice instance.

It should be understood that, in the embodiments of this application, indication information of the network slice may be represented using a network slice type, or may be represented using a network slice type and a service type, or may be represented using a service type and tenant information, or the like. This is not limited in the embodiments of this application. How to represent the indication information of the network slice is not described below. Optionally, a specific coding form of the indication information of the network slice is not limited, which may be carried on different fields of an interface message between different devices to respectively represent indication information of different network slices, or may be replaced using an abstracted index value, and different index values correspond to different network slices. Certainly, in addition to the foregoing identifiers, another identifier may be further used. This is not limited herein. It should be understood that if the terminal device, the access network device, or the core network device supports a plurality of network slices, indication information of the network slices supported by the terminal device, the access network device, or the core network device may be represented in a list form of at least one of the foregoing identifiers.

The embodiments of the present disclosure may be applied to another communications system that supports a network slice. The terms "system" and "network" may be interchangeable. System architectures described in the embodiments of the present disclosure are intended to describe the technical solutions in the embodiments of the present disclosure more clearly, and do not constitute any limitation to the technical solutions provided in the embodiments of the present disclosure. A person of ordinary skill in the art may know that with evolution of a network architecture, the technical solutions provided in the embodiments of the present disclosure are also applicable to similar technical problems.

Figure 2:
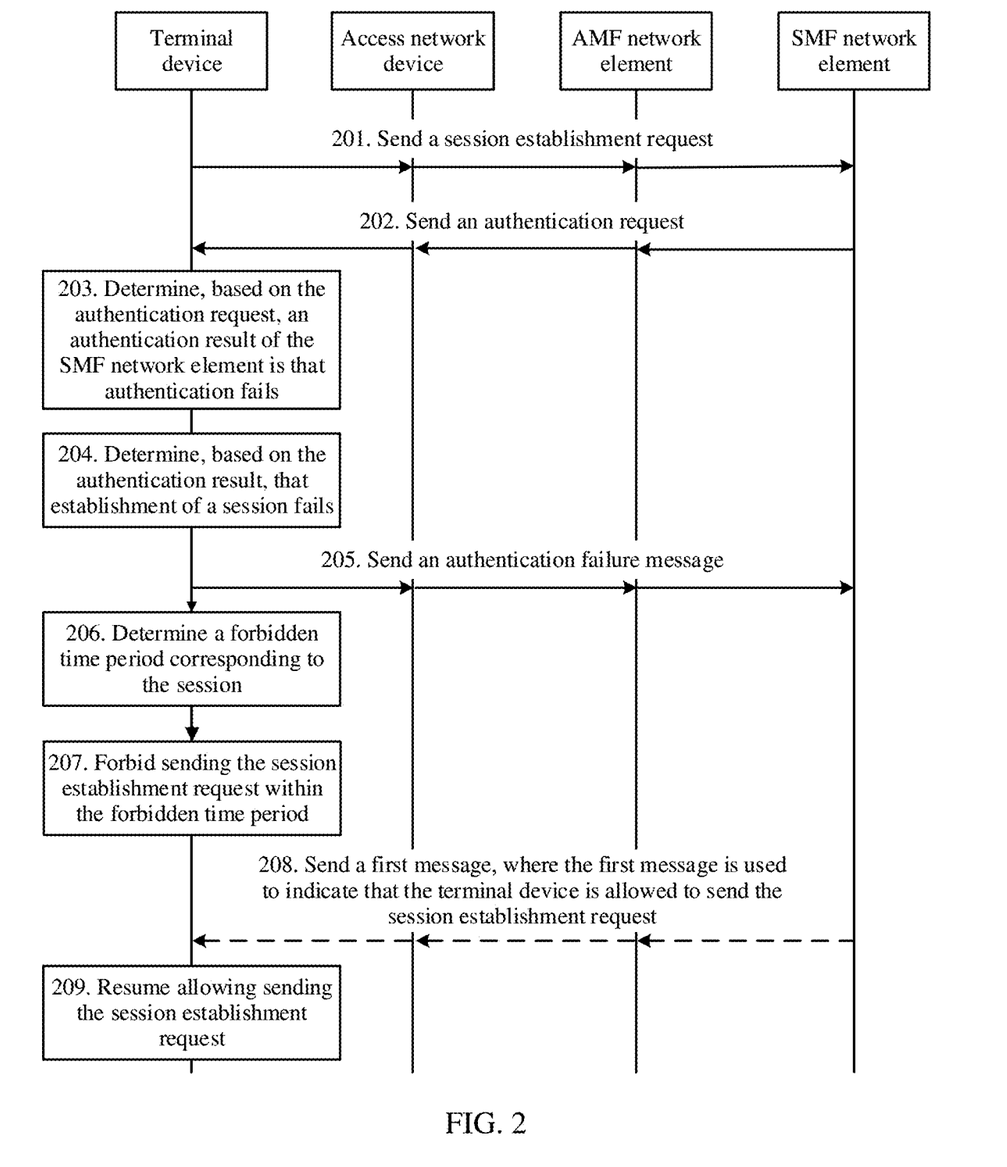
FIG. 2 is a schematic flowchart of a session processing method in wireless communications according to an embodiment of the present disclosure.

Based on the schematic architectural diagrams of the communications systems shown in FIG. 1A and FIG. 1B, referring to FIG. 2, another session processing method in wireless communications is provided in an embodiment of the present disclosure. In this embodiment, the communication method relates to a terminal device and a core network device (the core network device includes an SMF network element and an AMF network element). The terminal device and the SMF network element need to communicate with each other using an access network device and an AMF network element. For details, refer to the following specific description.

Step 201. The terminal device sends a session establishment request to the SMF network element. The session establishment request is used to request to establish a session. That the terminal device sends a session establishment request to the SMF network element includes the terminal device sending the session establishment request to an access network device, the access network device forwards the received session establishment request to the AMF network element, and the AMF network element forwards the received session establishment request to the SMF network element.

For example, the terminal device sends a first session establishment request to the access network device, where the first session establishment request includes a session requested to be established and indication information of a network slice corresponding to the session, and the network slice and the session are corresponding to each other. The access network device receives the first session establishment request, and selects an AMF network element for the terminal device based on the indication information of the network slice corresponding to the session. The AMF network element selected by the access network device supports the network slice corresponding to the session, and the access network device sends the first session establishment request to the AMF network element. The AMF network element receives the first session establishment request, and determines that the SMF network element that supports the network slice corresponding to the session provides a session management service for the terminal device. The AMF network element sends a second session establishment request to the SMF network element, where the second session establishment request includes a session requested to be established. The SMF network element receives the second session establishment request. If the SMF network element determines to accept the second session establishment request, the SMF network element further selects one UPF network element to provide a session service for the terminal device. Correspondingly, the SMF network element receives the session establishment request from the terminal device. Optionally, the indication information of the network slice may be not limited to the SST. Because the SST and the session are corresponding to each other, the access network device can determine, by carrying the SST, a session to be established by the terminal device, and select an AMF network element that supports the SST. Similarly, the AMF network element may also select an SMF network element based on the SST. For example, if a service of the URLLC type in the terminal device needs to establish a session, an SST corresponding to the URLLC type is carried in the first session establishment request.

Step 202. The SMF network element sends an authentication request to the terminal device. When the SMF network element receives the session establishment request in step 201, step 202 is performed, and the terminal device receives the authentication request sent by the SMF network element. For example, the SMF network element sends the authentication request to the AMF, the AMF network element sends the received authentication request to the access network device, and the access network device sends the received authentication request to the terminal device. Correspondingly, the terminal device receives the authentication request.

Step 203. The terminal device authenticates the core network device based on the authentication request to obtain an authentication result, where the authentication result is that authentication fails.

After the terminal device receives the authentication request sent by the SMF network element, the terminal device starts to authenticate the SMF network element. If the authentication result is that authentication succeeds, it indicates that the SMF network element is an accessible core network device and sends an authentication success message to the SMF network element. If the authentication result is that authentication fails, it indicates that the SMF network element is an inaccessible core network device. The terminal device performs step 204 to determine, based on the authentication result, that establishment of the session fails, performs step 205 that the terminal device sends an authentication failure message to the SMF network element, and performs the step 206 that the terminal device determines a forbidden time period corresponding to the session.

Step 204. The terminal device determines, based on the authentication result, that establishment of the session fails. If the terminal device determines that the authentication result of the core network device is that authentication fails, the terminal device determines that establishment of the session fails. Then, the terminal device starts to perform step 206.

Step 205. The terminal device sends an authentication failure message to the SMF network element. The terminal device sends the authentication failure message to the access network device, the access network device sends the received authentication failure message to the AMF network element, and the AMF network element sends the received authentication failure message to the SMF network element. Correspondingly, the SMF network element receives the authentication failure message sent by the terminal device.

Optionally, an execution sequence of step 204 and step 205 is not limited in this embodiment of the present disclosure.

Step 206. The terminal device determines a forbidden time period corresponding to the session.

If the terminal device determines, based on the authentication result, that establishment of the session fails, it indicates that the session requested by the terminal device cannot be established. Because authentication failure cannot be resolved in a short time, even after the terminal device determines that the authentication on the SMF network element fails, a case in which the authentication on the SMF network element fails still occurs when step 201 is performed again. Therefore, signaling overheads can be reduced by forbidding the terminal device from sending the session establishment request.

In an example, if the terminal device sends the authentication failure message to the SMF network element, the forbidden time period determined in step 206 indicates permanent forbidding, that is, the forbidden time period is infinite. Because the authentication failure cannot be resolved within a certain time range, the permanent forbidding may be performed to prevent a waste of signaling interaction between the terminal device and a network side device. The forbidden time period corresponding to the session is determined by the terminal device.

In an example, sessions may be distinguished using network slices corresponding to the sessions. In this way, the forbidden time period corresponding to the session determined by the terminal device may be understood as a forbidden time period corresponding to indication information of the network slice corresponding to the session. The indication information of the network slice is described using an SST as an example. For example, the terminal device stores a forbidden time period corresponding to each of a plurality of SSTs. If the authentication failure message is received, the terminal device determines an SST corresponding to the session, searches for a forbidden time period corresponding to the SST, and finally determines the found forbidden time period as the forbidden time period corresponding to the SST. Optionally, the forbidden time period corresponding to each of the plurality of stored SSTs is set by a vendor of the terminal device, or is configured using a communications protocol. This is not limited in this embodiment of the present disclosure. For another example, the terminal device stores forbidden time periods corresponding to different reasons of the session establishment failure if establishment of the session fails, and an authentication failure is one of the reasons of the session establishment failure. For example, if the authentication fails, the terminal device searches for a forbidden time period corresponding to the authentication failure, and determines the found forbidden time period as the forbidden time period corresponding to the session.

Optionally, if a current moment is not within the forbidden time period, the terminal device is allowed to send the session establishment request. For example, after the forbidden time ends, the terminal device may send the session establishment request.

Optionally, the terminal device may set an SST forbidden list, where the forbidden list includes a forbidden SST. Optionally, the SST forbidden list may further include a forbidden time corresponding to the forbidden SST. For example, a timer is used to indicate the forbidden time. When timing of the timer ends, it indicates that forbidding on the SST ends, and the SST is deleted from the forbidden list. For another example, a forbidden end moment is calculated using a forbidden start moment and a forbidden time period. Once the forbidden end moment is reached, it indicates that forbidding on the SST ends, and the SST is deleted from the forbidden list. Indication information in another form included in the indication information of the network slice may also be implemented in an SST manner. Details are not described herein again.

For example, the terminal device determines that establishment of a session fails and an SST corresponding to the session is an SST 1, and determines that a forbidden time period corresponding to the SST 1 is 800 seconds. From a current moment, a remaining forbidden duration corresponding to the SST 1 is 800 seconds. An existing forbidden list includes an SST 2 and an SST 3, and the SST 1 is added to the forbidden list. Referring to Table 1, Table 1 is a forbidden list after the SST 1 is added, and the forbidden list includes a forbidden SST and a remaining forbidden duration corresponding to each forbidden SST.

TABLE 1

| Forbidden SST | Remaining forbidden duration (seconds (s)) |
|---|---|
| SST 2 | 600 |
| SST 3 | 320 |
| SST 1 | 800 |

Further, referring to Table 2, Table 2 is another forbidding list after the SST 1 is added. The forbidding list includes a forbidden SST, a forbidden start moment corresponding to each SST, a determined forbidden time period, and a determined forbidden end moment. Optionally, the forbidden start moment may be a moment at which the terminal device determines the forbidden time period corresponding to the SST, or a moment at which establishment of the session fails is determined, or the like. This is not limited in this embodiment of the present disclosure.

TABLE 2

| Forbidden SST | Forbidden start time | Forbidden time period (s) | Forbidden end time |
|---|---|---|---|
| SST 2 | 12:30:15 | 600 | 12:40:15 |
| SST 3 | 16:20:05 | 320 | 16:25:25 |
| SST 1 | 17:13:50 | 800 | 17:27:10 |

Step 207. The terminal device is forbidden from sending the session establishment request within the forbidden time period. For example, after the SST is added to the forbidding list, the terminal device is forbidden from sending the session establishment request corresponding to the SST within the forbidden time period. Optionally, if receiving a session establishment request including the SST, the terminal device rejects to send the session establishment request, and may further output prompt information on a display or another interface of the terminal device, where the prompt information is used to indicate that the session establishment request corresponding to the SST is not allowed to be sent within a range of the forbidden time period. For example, the permanent forbidding indicates that the forbidden time does not end, and in this way, the permanent forbidding indicates that the session establishment request is permanently forbidden to be sent.

Step 208. The SMF network element sends a first message to the terminal device. The first message is used to indicate that the terminal device is allowed to send the session establishment request. For example, the SMF network element sends the first message to the AMF network element, the AMF network element sends the received first message to the access network device, and the access network device sends the received first message to the terminal device. Correspondingly, the terminal device receives the first message sent by the SMF network element. Optionally, the first message includes indication information of a network slice corresponding to the session such that the terminal device determines a session that is allowed to be established as requested.

For example, the first message is a device trigger message. Optionally, after receiving the device trigger message, the terminal device sends a device response message to the SMF network element.

Step 209. The terminal device resumes allowing sending the session establishment request. When the forbidden time period corresponding to the session ends, step 209 may be performed, or when the forbidden time period corresponding to the session does not end and the first message is received, step 209 may be performed.

Further, if the session is still within the forbidden time period, starting from a moment at which the terminal device receives the first message, the terminal device resumes allowing sending the session establishment request corresponding to the session. In this case, the terminal device may initiate a session establishment request according to a service requirement of the user. It may be understood that, if the first message is not received within the forbidden time period, the terminal device is still allowed to send the session establishment request corresponding to the session. For example, the first message carries an SST 4. If the current moment is still within a range of the forbidden time period corresponding to the SST 4, the terminal device cancels forbidding on the SST 4, and is allowed to send a session establishment request corresponding to the SST 4.

Optionally, when establishment of the session fails due to the authentication failure, when the forbidden time period corresponding to the SST 4 indicates permanent forbidding, and if the terminal device receives the first message including the SST 4, forbidding on the SST 4 may also be canceled.

It should be noted that, for step 206, if the session is a preset session that is not forbidden, the terminal device allows continuing sending the session establishment request. For example, the preset session that is not forbidden is an emergency call service. If the session requested to be established in step 201 is the emergency call service, when the terminal device determines, using step 202 and step 203, that establishment of the session fails, in this embodiment of the present disclosure, step 206 and step 207 are not performed on the service.

Optionally, if a session type corresponding to the session is changed to a session type that is unavailable to the terminal device, the terminal device is forbidden from sending a session establishment request including the session type within the forbidden time period or at another moment. For example, when the terminal device changes a subscribed service bundle, a session type is changed. No matter whether the service type is within the forbidden time range, and after the session type is changed to the session type that is unavailable to the terminal device, the terminal device cannot send a session establishment request of the session type. Further, optionally, in the forbidden list manner, if an SST corresponding to the session is still within a range of the forbidden time period, the SST may be deleted from the forbidden list.

Optionally, if a serving network of the terminal device is changed from a first PLMN to a second PLMN, a network device of the first PLMN supports a network slice corresponding to the session, and a network device of the second PLMN does not support the network slice corresponding to the session, the terminal device is forbidden from sending the session establishment request at another moment.

For example, the network slice corresponding to the session may be represented by indication information of the network slice. The indication information of the network slice is described using an SST as an example. If an SST 1 is a specific value belonging to the first PLMN, it indicates that a network device of the first PLMN supports the SST 1. If an SST 1 is a specific value that does not belong to the second PLMN, it indicates that a network device of the second PLMN does not support the SST 1. In this case, if the serving network of the terminal device is changed from the first PLMN to the second PLMN, the SST 1 is changed to an unavailable SST in the terminal device. Therefore, regardless of whether the change occurs within the forbidden time period or after the forbidden time period ends, once the change occurs, the terminal device is forbidden from sending the session establishment request including the SST 1.

Optionally, within the forbidden time period, if a serving network of the terminal device is changed from a first PLMN to a second PLMN, and both a network device of the first PLMN and a network device of the second PLMN support a network slice corresponding to the session, the terminal device is forbidden from sending the session establishment request within the forbidden time period.

For example, the network slice corresponding to the session may be represented by indication information of the network slice. The indication information of the network slice is described using an SST as an example. If an SST 1 is a specific value belonging to the first PLMN and a specific value belonging to the second PLMN, it indicates that both a network device of the first PLMN and a network device of the second PLMN support the SST 1. In this case, even the serving network of the terminal device is changed from the first PLMN to the second PLMN, the forbidden time period corresponding to the SST 1 still continues, and after the forbidden time period ends, the terminal device may send the session establishment request including the SST 1.

Optionally, network devices in both the first PLMN and the second PLMN include an AMF network element and an SMF network element on a core network side. For example, when the terminal device registers with the first PLMN, a first AMF network element of the first PLMN notifies the terminal device of a network slice supported by the first AMF network element. Similarly, when the serving network of the terminal device is changed to the second PLMN, a second AMF network element of the second PLMN notifies the terminal device of a network slice supported by the second AMF network element. In this way, after the serving network is changed, the terminal device may determine whether a network device in a new serving network supports a specific network slice, and further determine whether a session corresponding to the network slice continues forbidding sending the session establishment request.

In this embodiment of the present disclosure, after the terminal device sends the session establishment request, if the terminal device obtains the authentication failure message, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

Figure 3:
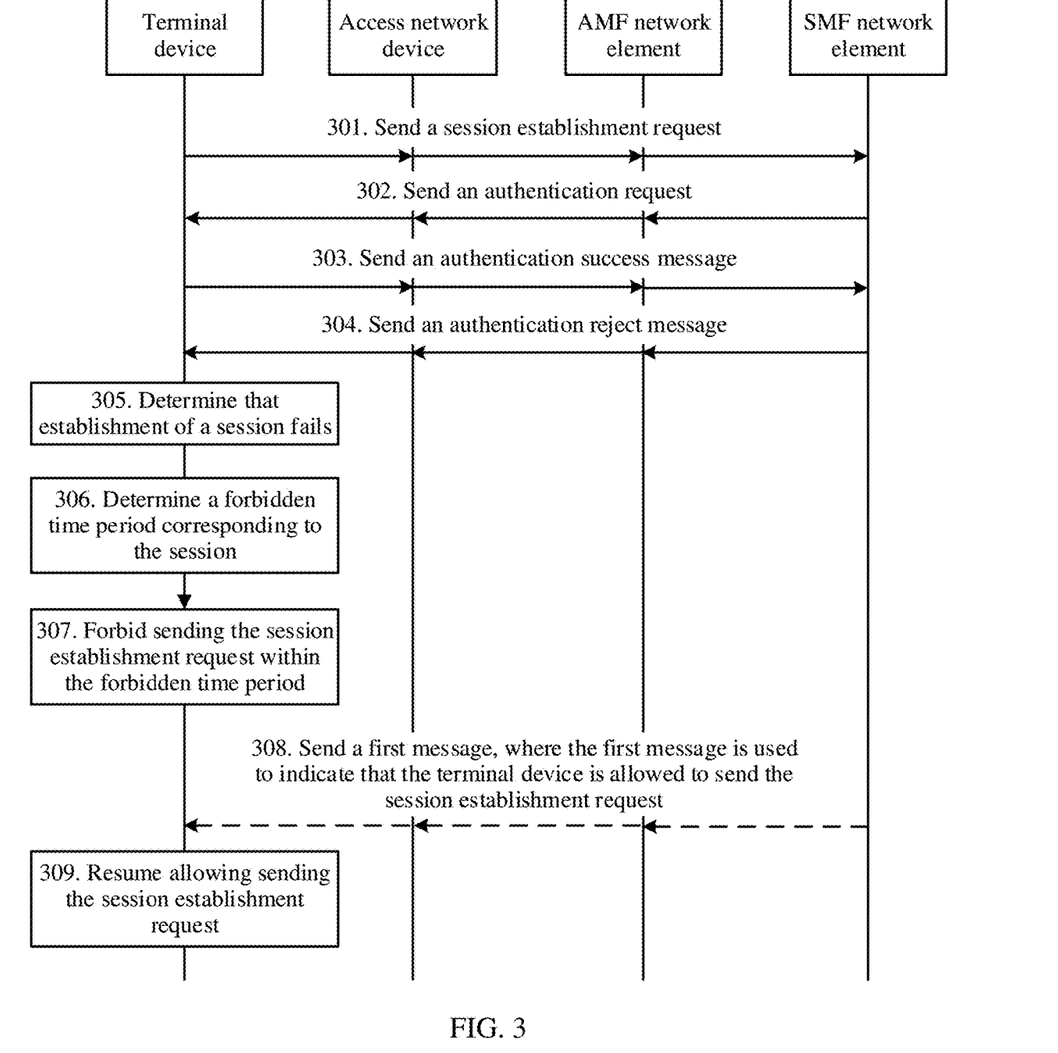
FIG. 3 is a schematic flowchart of another session processing method in wireless communications according to an embodiment of the present disclosure.

Based on the schematic architectural diagrams of the communications systems shown in FIG. 1A and FIG. 1B, referring to FIG. 3, another session processing method is provided in an embodiment of the present disclosure. In this embodiment, the communication method relates to a terminal device and a core network device (the core network device includes an SMF network element and an AMF network element). The terminal device and the SMF network element need to communicate with each other using an access network device and an AMF network element. For details, refer to the following specific description.

Step 301. The terminal device sends a session establishment request to the SMF network element. For a specific implementation of step 301, refer to the detailed description in step 201 in the embodiment shown in FIG. 2.

Step 302. The SMF network element sends an authentication request to the terminal device.

Step 303. The terminal device sends an authentication success message to the SMF network element. For step 302 and step 303, when the SMF network element receives the session establishment request in step 301, step 302 is performed, that is, the authentication request is sent to the terminal device. Correspondingly, the terminal device receives the authentication request sent by the SMF network element.

After the terminal device receives the authentication request sent by the SMF network element, the terminal device starts to authenticate the SMF network element. If the authentication succeeds, it indicates that the SMF network element is an accessible core network device, step 303 is performed, and the terminal device sends an authentication success message to the SMF network element. If the authentication fails, it indicates that the SMF network element is an inaccessible core network device, and an authentication failure message is sent to the SMF network element. Correspondingly, for step 303, the SMF network element receives the authentication success message sent by the terminal device.

Step 304. The SMF network element sends an authentication reject message to the terminal device. After the SMF network element receives the authentication success message, the SMF network element may further authenticate the terminal device to determine whether the terminal device is an unauthorized access device. If the SMF network element determines that an authentication result of the terminal device is that authentication succeeds, it indicates that the SMF network element may provide a session management service for the terminal device. Optionally, the SMF network element may allocate a network resource to a session required to be established by the terminal device. If the SMF network element determines that an authentication result of the terminal device is that authentication fails, it indicates that the SMF network element cannot provide a session management service for the terminal device, step 304 is performed, and the SMF network element may send the authentication reject message to the terminal device. Correspondingly, for step 304, the terminal device receives the authentication reject message sent by the SMF network element.

Step 305. The terminal device determines that establishment of the session fails. When the terminal device receives the authentication reject message sent by the SMF network element, it indicates that the session requested by the terminal device cannot be established, further indicates that establishment of the session fails, and step 306 is performed.

Step 306. The terminal device determines a forbidden time period corresponding to the session. Because authentication reject cannot be resolved in a short time, even after the authentication reject message is received, a case in which the SMF network element rejects the authentication to the terminal device still occurs when the terminal device performs step 301 again. Therefore, signaling overheads can be reduced by forbidding the terminal device from sending the session establishment request.

Optionally, if the terminal device receives the authentication reject message sent by the SMF network element, the forbidden time period determined in step 306 indicates permanent forbidding, that is, the forbidden time period is infinite. Because authentication reject cannot be resolved within a certain time range, the permanent forbidding may be performed to prevent a waste of signaling interaction between the terminal device and a network side device.

In an example, sessions may be distinguished using network slices corresponding to the sessions. In this way, the forbidden time period corresponding to the session determined by the terminal device may be understood as a forbidden time period corresponding to indication information of the network slice corresponding to the session. The indication information of the network slice is described using an SST as an example.

In a first optional solution, the authentication reject message carries a forbidden time period corresponding to the session. Optionally, the forbidden time period corresponding to the session is determined by the SMF network element. For example, the SMF network element stores a forbidden time period corresponding to each of a plurality of SSTs. If the authentication is rejected, the SMF network element determines an SST corresponding to the session, searches for a forbidden time period corresponding to the SST, and finally carries the found forbidden time period in the authentication reject message such that the terminal device directly determines, using the authentication reject message, the forbidden time period corresponding to the SST. For another example, the SMF network element stores forbidden time periods corresponding to different reasons of the session establishment failure if establishment of the session fails, and the authentication reject message is one of the reasons of the session establishment failure. For example, when the SMF network element determines that authentication is rejected, the SMF network element searches for a forbidden time period corresponding to the authentication reject message, carries the found forbidden time period in the authentication reject message such that the terminal device directly determines, using the authentication reject message, the forbidden time period corresponding to the session. In the first optional solution, optionally, the forbidden time period corresponding to each of the plurality of stored SSTs is set by the SMF network element, or is configured using a communications protocol. This is not limited in this embodiment of the present disclosure.

In a second optional solution, the authentication reject message does not carry a forbidden time period corresponding to the session. The forbidden time period corresponding to the session is determined by the terminal device. For example, the terminal device stores a forbidden time period corresponding to each of a plurality of SSTs. If the authentication reject message is received, the terminal device determines an SST corresponding to the session, searches for a forbidden time period corresponding to the SST, and finally determines the found forbidden time period as the forbidden time period corresponding to the SST. For another example, the terminal device stores forbidden time periods corresponding to different reasons of the session establishment failure if establishment of the session fails, and the authentication reject message is one of the reasons of the session establishment failure. For example, if the authentication reject message is received, the terminal device searches for a forbidden time period corresponding to the authentication reject message, and determines the found forbidden time period as the forbidden time period corresponding to the session. In the second optional solution, optionally, the forbidden time period corresponding to each of the plurality of stored SSTs is set by a vendor of the terminal device, or is configured using a communications protocol. This is not limited in this embodiment of the present disclosure.

Further, for a specific implementation of the forbidden time period and a specific implementation of canceling the forbidding, refer to the specific description in the embodiment shown in FIG. 2. Details are not described herein again.

Step 307. The terminal device is forbidden from sending the session establishment request within the forbidden time period.

Step 308. The SMF network element sends a first message to the terminal device.

Step 309. The terminal device resumes allowing sending the session establishment request. For step 307, step 308, and step 309, refer to the detailed descriptions in step 207, step 208, and step 209 in the embodiment shown in FIG. 2. Details are not described herein again.

In this embodiment of the present disclosure, after the terminal device sends the session establishment request, if the terminal device receives the authentication reject message, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

Figure 4:
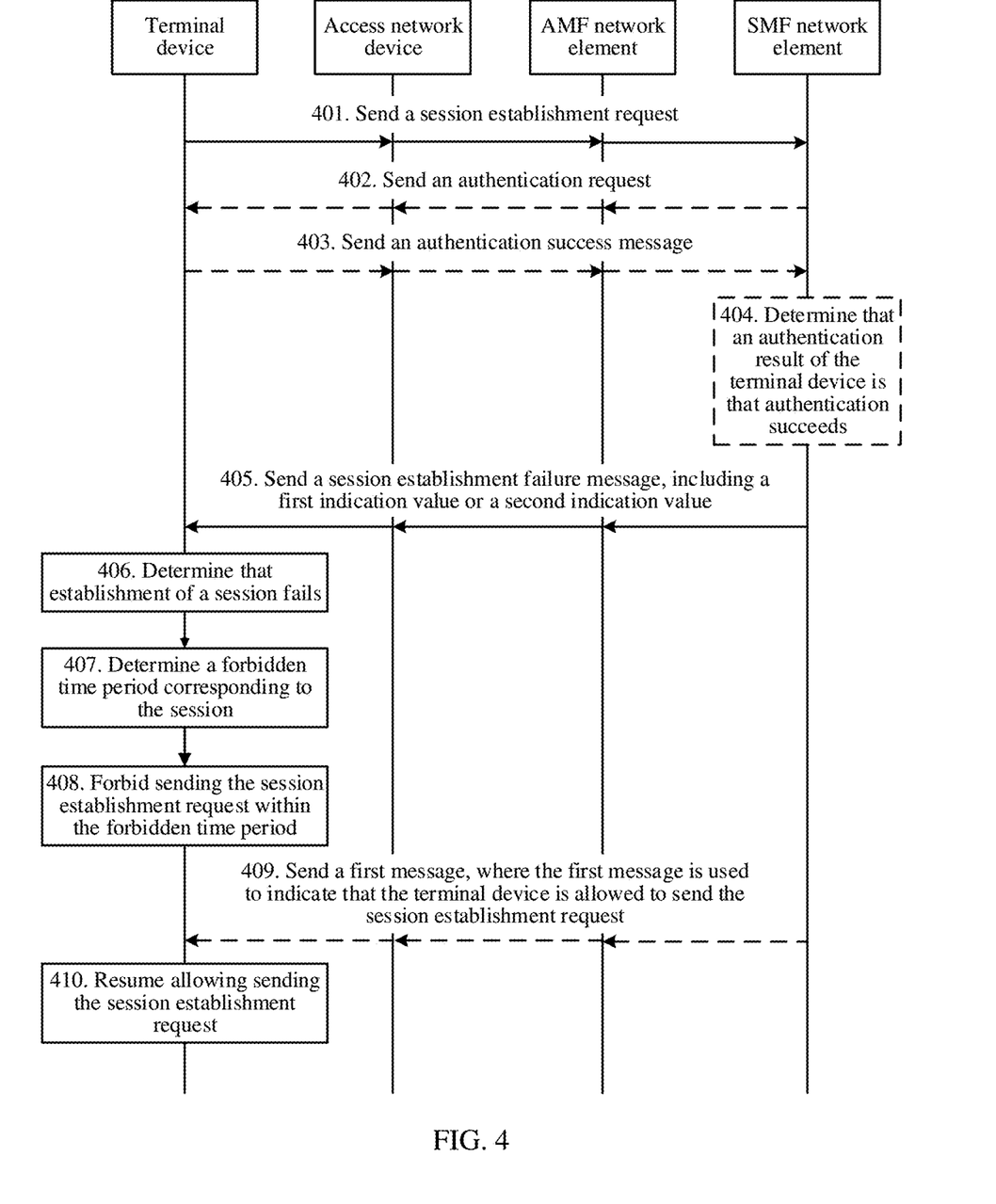
FIG. 4 is a schematic flowchart of another session processing method in wireless communications according to an embodiment of the present disclosure.

Based on the schematic architectural diagrams of the communications systems shown in FIG. 1A and FIG. 1B, referring to FIG. 4, another session processing method is provided in an embodiment of the present disclosure. In this embodiment, the communication method relates to a terminal device and a core network device (the core network device includes an SMF network element and an AMF network element). The terminal device and the SMF network element need to communicate with each other using an access network device and an AMF network element. For details, refer to the following specific description.

Step 401. The terminal device sends a session establishment request to the SMF network element. For a specific implementation of step 401, refer to the detailed description in step 201 in the embodiment shown in FIG. 2.

Step 402. The SMF network element sends an authentication request to the terminal device.

Step 403. The terminal device sends an authentication success message to the SMF network element. For specific implementations of step 402 and step 403, refer to the detailed descriptions in step 302 and step 303 in the embodiment shown in FIG. 3.

Step 404. The SMF network element determines that an authentication result of the terminal device is that authentication succeeds. After the SMF network element receives the authentication success message, the SMF network element may further authenticate the terminal device, to determine whether the terminal device is an unauthorized access device. If the SMF network element determines that an authentication result of the terminal device is that authentication succeeds, it indicates that the SMF network element may provide a session management service for the terminal device, and allocate a network resource to a session required to be established by the terminal device. If the SMF network element determines that an authentication result of the terminal device is that authentication fails, it indicates that the SMF network element cannot provide a session management service for the terminal device, and optionally, the SMF network element may send the authentication reject message to the terminal device.

Optionally, step 402, step 403, and step 404 are optional steps, that is, after the SMF network element receives the session establishment request sent by the terminal device, step 405 is performed.

Step 405. The SMF network element sends a session establishment failure message to the terminal device. The session establishment failure message includes first indication information or second indication information. The first indication information is used to indicate that a resource of a network slice, in the core network device, corresponding to the session is limited. That is, a session establishment failure of the terminal device is caused by limited resource of the network slice corresponding to the session. The second indication information is used to indicate that a network slice, in the core network device, corresponding to the session is unavailable. That is, the session establishment failure of the terminal device is caused by unavailability of the network slice corresponding to the session.

For example, after the SMF network element receives the session establishment request in step 401 or determines that the authentication result of the terminal device is that authentication succeeds, the SMF network element may allocate a network resource to the session of the terminal device, where the network resource includes a control plane resource and a user plane resource. If the network resource corresponding to the session in the SMF is insufficient, a session establishment failure message including the first indication information is sent to the terminal device. If a network slice in which the SMF network element is located is unavailable, a session establishment failure message including the second indication information is sent to the terminal device.

Step 406. The terminal device determines that establishment of the session fails. When the terminal device receives the session establishment failure message sent by the SMF network element, it indicates that the session requested by the terminal device cannot be established, and step 407 is performed.

Step 407. The terminal device determines a forbidden time period corresponding to the session. When the terminal device receives the session establishment failure message, because the problem that the network slice is unavailable or the network resource is insufficient cannot be resolved in a short time, even after the terminal device receives the session establishment failure message, a case in which the terminal device receives a corresponding failure message still occurs when the step 401 is performed again. Therefore, signaling overheads can be reduced by forbidding the terminal device from sending the session establishment request.

Optionally, when the terminal device receives the session establishment failure message, the forbidden time period determined using step 407 indicates temporary forbidding, that is, the forbidden time period is a preset time period. Optionally, for the specific manner of determining the forbidden time period, refer to the specific descriptions of the first optional solution and the second optional solution in step 306 in the embodiment shown in FIG. 3. For a specific implementation of the forbidden time period and a specific implementation of canceling the forbidding, refer to the specific description in the embodiment shown in FIG. 2. Details are not described herein again.

Step 408. The terminal device is forbidden from sending the session establishment request within the forbidden time period.

Step 409. The SMF network element sends a first message to the terminal device.

Step 410. The terminal device resumes allowing sending the session establishment request. For step 408, step 409, and step 410, refer to the detailed descriptions in step 207, step 208, and step 209 in the embodiment shown in FIG. 2. Details are not described herein again.

In this embodiment of the present disclosure, after the terminal device sends the session establishment request, the terminal device receives the session establishment failure message sent by the SMF network element, the terminal device is forbidden, by determining a forbidden time period, from sending the session establishment request within the forbidden time period, thereby reducing signaling interaction between the terminal device and a network side within a range of the forbidden time period. Further, a quantity of times of initiating the session establishment request is reduced to reduce a quantity of session establishment failures such that a probability of session establishment success can be increased.

Figure 5:
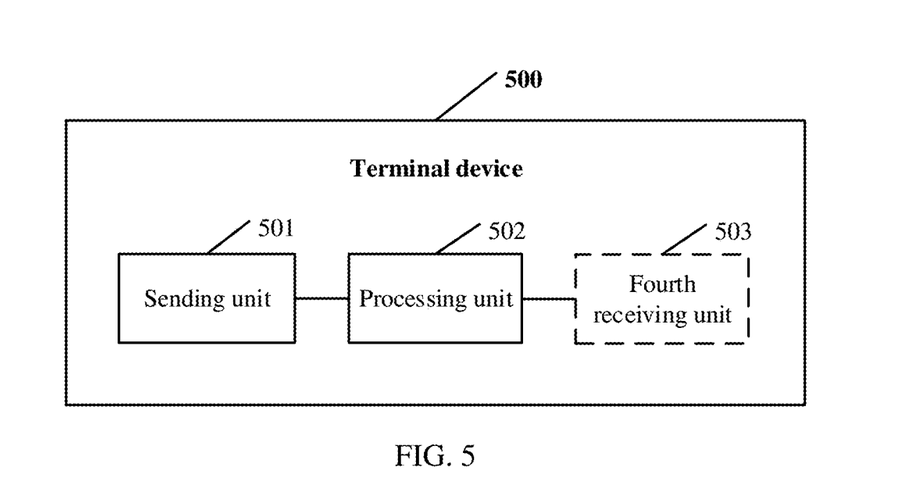
FIG. 5 is a schematic structural diagram of a terminal device according to an embodiment of the present disclosure.

Referring to FIG. 5, FIG. 5 is a schematic structural diagram of a terminal device according to an embodiment of this application. The terminal device 500 is configured to implement the embodiments shown in FIG. 2 to FIG. 4. As shown in FIG. 5, the terminal device includes a sending unit 501 configured to send a session establishment request to a core network device, where the session establishment request is used to request to establish a session, and the session is supported by a network slice corresponding to the session, a processing unit 502 configured to determine that establishment of the session fails, where the processing unit 502 is further configured to determine a forbidden time period corresponding to the session, and the processing unit 502 is further configured to forbid sending the session establishment request within the forbidden time period.

In a possible embodiment, the terminal device further includes a first receiving unit (not shown) configured to receive an authentication request from the core network device. The processing unit 502 is further configured to authenticate the core network device based on the authentication request to obtain an authentication result, and the authentication result is that authentication fails. In determining that establishment of the session fails, the processing unit 502 is further configured to determine, based on the authentication result, that establishment of the session fails.

In a possible embodiment, the terminal device further includes a second receiving unit (not shown) configured to receive an authentication reject message from the core network device. In determining that establishment of the session fails, the processing unit 502 is further configured to determine, based on the authentication reject message, that establishment of the session fails.

In a possible embodiment, the terminal device further includes a third receiving unit (not shown) configured to receive a session establishment failure message from the core network device, where the session establishment failure message includes first indication information or second indication information, the first indication information is used to indicate that a resource of the network slice is limited, and the second indication information is used to indicate that the network slice is unavailable. In determining that establishment of the session fails, the processing unit 502 is further configured to determine, based on the session establishment failure message, that establishment of the session fails.

In a possible embodiment, the authentication reject message includes the forbidden time period corresponding to the session.

In a possible embodiment, the session establishment failure message includes the forbidden time period corresponding to the session.

In a possible embodiment, the forbidden time period is used to indicate permanent forbidding, or the forbidden time period is a preset time period.

In a possible embodiment, the method further includes a fourth receiving unit 503 configured to receive a first message from the core network device within the forbidden time period, where the first message is used to indicate that the terminal device is allowed to send the session establishment request. The processing unit 502 is further configured to resume allowing sending the session establishment request in response to the first message.

In a possible embodiment, in forbidding sending the session establishment request within the forbidden time period, the processing unit 502 is further configured to, within the forbidden time period, if a serving network of the terminal device is changed from a first PLMN to a second PLMN, and both a network device of the first PLMN and a network device of the second PLMN support the network slice corresponding to the session, forbid sending the session establishment request within the forbidden time period.

In a possible embodiment, the session is indicated by SST information, and in forbidding sending the session establishment request within the forbidden time period, the processing unit 502 is further configured to forbid sending the session establishment request within the forbidden time period by maintaining an SST forbidden list, where the SST forbidden list includes a correspondence between the SST information and the forbidden time period. For details, refer to Table 1 or Table 2.

It may be understood that, for a specific implementation and a corresponding beneficial effect of function blocks included in the terminal device 500 in FIG. 5, refer to the specific descriptions in the embodiments in FIG. 2 to FIG. 4. Details are not described herein again.

Figure 6:
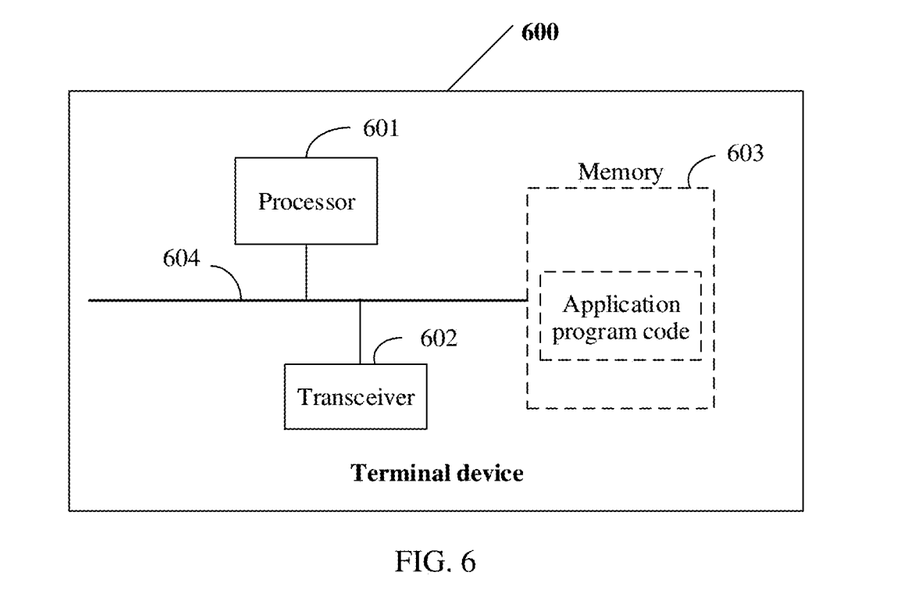
FIG. 6 is a schematic structural diagram of another terminal device according to an embodiment of the present disclosure.

The terminal device in the embodiment shown in FIG. 5 may be implemented by a terminal device 600 shown in FIG. 6. FIG. 6 is a schematic structural diagram of another terminal device according to an embodiment of the present disclosure. The terminal device 600 shown in FIG. 6 includes a processor 601 and a transceiver 602. The transceiver 602 is configured to support data transmission between the terminal device 600 and a session function management network element or an access network device in the foregoing embodiment. For example, the transceiver 602 is configured to implement functions of the sending unit 501 and the fourth receiving unit 503 in the embodiment shown in FIG. 5. Optionally, the transceiver 602 is further configured to implement a function of the first receiving unit, the second receiving unit, or the third receiving unit in the embodiment shown in FIG. 5. Optionally, the transceiver 602 may include a receiver and a transmitter.

The processor 601 is configured to implement a function of the processing unit 502 in the embodiment shown in FIG. 5. The processor 601 and the transceiver 602 are in a communication connection, for example, being connected using a bus 604. The terminal device 600 may further include a memory 603. The memory 603 is configured to store program code and data that are executed by the terminal device 600. The processor 601 is configured to execute application program code stored in the memory 603, to implement an action of the terminal device provided in any embodiment shown in FIG. 2 and FIG. 4. It should be noted that, in actual application, the terminal device may include one or more processors, and a structure of the terminal device 600 does not constitute any limitation on this embodiment of this application.

The processor 601 may be a central processing unit (CPU), a network processor (NP), a hardware chip, or any combination thereof. The hardware chip may be an application-specific integrated circuit (ASIC), a programmable logic device (PLD), or a combination thereof. The PLD may be a complex PLD (CPLD), a field programmable logic gate array (FPGA), a generic array logic (GAL), or any combination thereof.

The memory 603 may include a volatile memory such as a random access memory (RAM), or the memory 603 may include a non-volatile memory such as a read-only memory (ROM), a flash memory, a hard disk drive (HDD), or a solid-state drive (SSD), or the memory 603 may include a combination of the foregoing types of memories.

An embodiment of the present disclosure further provides a computer storage medium. The computer storage medium may be configured to store a computer software instruction used by the terminal device in the embodiment shown in FIG. 5, and the computer software instruction includes a program designed for the terminal device in the foregoing embodiment. The storage medium includes but is not limited to a flash memory, a hard disk, or a solid-state drive.

An embodiment of the present disclosure further provides a computer program product. When being run by a computing device, the computer program product may perform a communication method designed for the terminal device in the embodiment in FIG. 5.

In the foregoing embodiments, the corresponding method procedures may be fully or partially implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of the present disclosure are all or partially generated. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible to a computer, or a data storage device, such as a server or a data center, integrating one or more usable media. The usable medium may be a magnetic medium (for example, a FLOPPY DISK, a hard disk, or a magnetic tape), an optical medium (for example, a digital versatile disc (DVD)), a semiconductor medium (for example, an SSD), or the like.

In the specification, claims, and accompanying drawings of this application, the terms "first", "second", "third", "fourth", and the like are intended to distinguish between different objects but do not indicate a particular order. In addition, the terms "including" and "having" and any other variants thereof are intended to cover non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Although this application is described with reference to specific features and the embodiments thereof, obviously, various modifications and combinations may be made to this application without departing from the spirit and scope of this application. Correspondingly, the specification and accompanying drawings are merely example descriptions of this application defined by the accompanying claims, and are considered as any or all of modifications, variations, combinations, or equivalents that cover the scope of this application. Obviously, a person skilled in the art can make various modifications and variations to this application without departing from the spirit and scope of this application. In this case, this application is intended to cover these modifications and variations of this application provided that they fall within the scope defined by the following claims and their equivalent technologies.

What is claimed is:

1. A session processing method in wireless communications implemented by a terminal device, comprising:
    sending a request for establishing a session to a core network device, wherein the request comprises information for the session;
    receiving a first message from the core network device, wherein the first message comprises indication information and a forbidden time period, wherein the forbidden time period is for a network slice, and wherein the indication information indicates that a resource of the network slice is limited;
    determining, based on the first message, that establishment of the session has failed;
    identifying that a serving network of the terminal device is changed from a first public land mobile network (PLMN) to a second PLMN within the forbidden time period; and
    forbidding the terminal device, served by the second PLMN, from sending a second request for establishing a second session associated with the network slice within the forbidden time period.

2. The session processing method of claim 1, wherein the forbidden time period indicates permanent forbidding.

3. The session processing method of claim 1, wherein the forbidden time period is a preset time period.

4. The session processing method of claim 1, further comprising receiving a second message from the core network device within the forbidden time period, wherein the second message indicates that the terminal device is allowed to send the second request.

5. The session processing method of claim 4, further comprising resuming, in response to the second message, allowing sending the second request.

6. The session processing method of claim 1, wherein the information for the session includes slice/service type (SST) information indicating the session, and wherein the session processing method further comprises maintaining an SST forbidden list, and wherein the SST forbidden list comprises a correspondence between the SST information and the forbidden time period.

7. The session processing method of claim 1, wherein both a network device of the first PLMN and a network device of the second PLMN support the network slice.

8. The session processing method of claim 1, wherein that a network device of the first PLMN supports the network slice, and a network device of the second PLMN does not support the network slice, wherein the session processing method further comprises forbidding the terminal device from sending a third request for establishing a third session associated with the network slice at any time when the terminal is located in the second PLMN.

9. The session processing method of claim 1, wherein the request comprises information about the network slice, wherein the network slice supports the session.

10. An apparatus, comprising:
    a transmitter configured to send a request for establishing a session to a core network device, wherein the request comprises information for the session;
    a receiver and configured to receive a first message from the core network device, wherein the first message comprises indication information and a forbidden time period, wherein the forbidden time period is for a network slice, and wherein the indication information indicates that a resource of the network slice is limited; and a processor coupled to the transmitter and the receiver, wherein the processor is configured to:
determine, based on the first message, that establishment of the session has failed;
identify that a serving network of a terminal device is changed from a first public land mobile network (PLMN) to a second PLMN within the forbidden time period; and
forbid sending a second request for establishing a second session associated with the network slice within the forbidden time period in the second PLMN.

11. The apparatus of claim 10, wherein the forbidden time period indicates permanent forbidding.

12. The apparatus of claim 10, wherein the forbidden time period is a preset time period.

13. The apparatus of claim 10, wherein the receiver is further configured to receive a second message from the core network device within the forbidden time period, and wherein the second message indicates that the apparatus is allowed to send the second request.

14. The apparatus of claim 13, wherein the processor is further configured to resume allowing sending the second request in response to the second message.

15. The apparatus of claim 10, wherein the information for the session includes slice/service type (SST) information indicating the session, and wherein the processor is configured to forbid sending the second request within the forbidden time period by maintaining an SST forbidden list, and wherein the SST forbidden list comprises a correspondence between the SST information and the forbidden time period.

16. The apparatus of claim 10, wherein both a network device of the first PLMN and a network device of the second PLMN support the network slice.

17. The apparatus of claim 10, wherein a network device of the first PLMN supports the network slice, and a network device of the second PLMN does not support the network slice, and wherein the processor is further configured to forbid the terminal device from sending a third request for establishing a third session associated with the network slice at any time when the terminal is located in the second PLMN.

18. A non-transitory computer-readable medium comprising computer-executable instructions that, when executed by a processor, cause a terminal device to:
send a request for establishing a session to a core network device, wherein the request comprises information for the session;
receive a first message from the core network device, wherein the first message comprises indication information and a forbidden time period, wherein the forbidden time period is for a network slice, and wherein the indication information indicates that a resource of the network slice is limited;
determine, based on the first message, that establishment of the session has failed;
identify that a serving network of the terminal device is changed from a first public land mobile network (PLMN) to a second PLMN within the forbidden time period; and
forbid the terminal device, served by the second PLMN, from sending a second request for establishing a second session associated with the network slice within the forbidden time period.

19. The non-transitory computer-readable medium of claim 18, wherein the forbidden time period indicates permanent forbidding or the forbidden time period is a preset time period.

20. The non-transitory computer-readable medium of claim 18, wherein the computer-executable instructions further cause the terminal device to receive a second message from the core network device within the forbidden time period, and wherein the second message indicates that the terminal device is allowed to send the second request.

* * * * *